United States Patent [19]
Ogden

[11] Patent Number: 4,510,916
[45] Date of Patent: Apr. 16, 1985

[54] BARBEQUE GRILL WITH PAPER START FACILITY

[76] Inventor: Ralph Ogden, 1304 Fisher St., Munster, Ind. 46321

[21] Appl. No.: 617,076

[22] Filed: Jun. 4, 1984

Related U.S. Application Data

[63] Continuation-in-part of Ser. No. 502,705, Jun. 9, 1983, abandoned.

[51] Int. Cl.[3] .......................... A47J 37/07; F24B 3/00
[52] U.S. Cl. ................................ 126/25 B; 126/25 R; 126/9 R
[58] Field of Search ................ 126/25 B, 25 R, 9 R, 126/59.5, 9 B, 29, 30

[56] References Cited

U.S. PATENT DOCUMENTS

| | | | |
|---|---|---|---|
| 2,920,614 | 1/1960 | Phelps | 126/9 R |
| 3,046,970 | 7/1962 | Seaman | 126/9 R |
| 3,073,263 | 1/1963 | Wynkoop | 126/9 R |
| 3,209,743 | 10/1965 | Stewart et al. | 126/25 B |
| 3,216,379 | 11/1965 | Durfee | 126/25 B |
| 3,453,975 | 7/1969 | Gunter | 126/25 B |
| 3,499,399 | 3/1970 | Kaufmann | 126/25 B |
| 3,841,299 | 10/1974 | Tomita | 126/25 B |
| 3,865,052 | 2/1975 | Streets et al. | 126/25 B |
| 4,227,510 | 10/1980 | Frazier et al. | 126/25 B |

Primary Examiner—James C. Yeung
Attorney, Agent, or Firm—McWilliams, Mann, Zummer & Sweeney

[57] ABSTRACT

A barbeque grill with paper start facility comprising an open top receptacle defining a floor that includes one or more draft openings of adjustable size, a tinder receiver in association with the receptacle at its central axis and in alignment with the draft openings, a charcoal support grid and means for removably mounting same in the receptacle over the receptacle floor and above and adjacent the upper end of the tinder receiver, a charcoal receiver in the form of an open ended sleeve of impervious sheet metal material that includes a pair of oppositely located handles adjacent its upper end, which charcoal receiver is proportioned to be disposed in substantially congruent relation with the tinder receiver and on the charcoal support grid above the tinder receiver, and a food cooking grid and means for removably mounting same in the receptacle above the charcoal grid after the charcoal is ignited.

12 Claims, 15 Drawing Figures

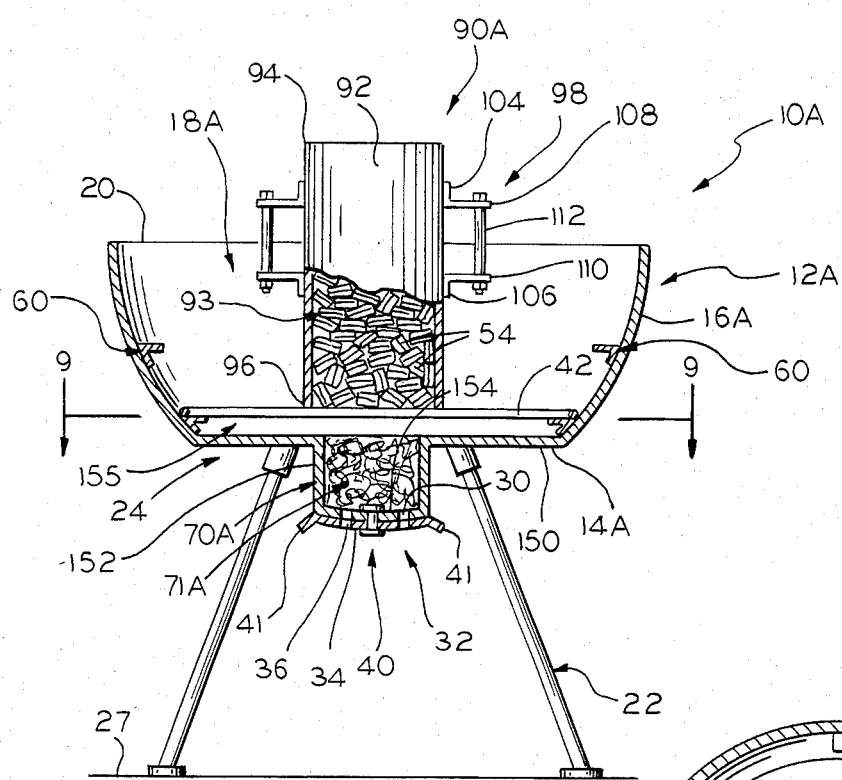
FIG. 8
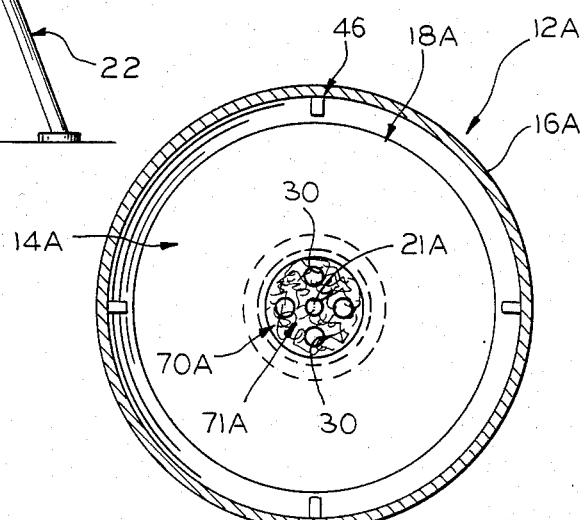
FIG. 9
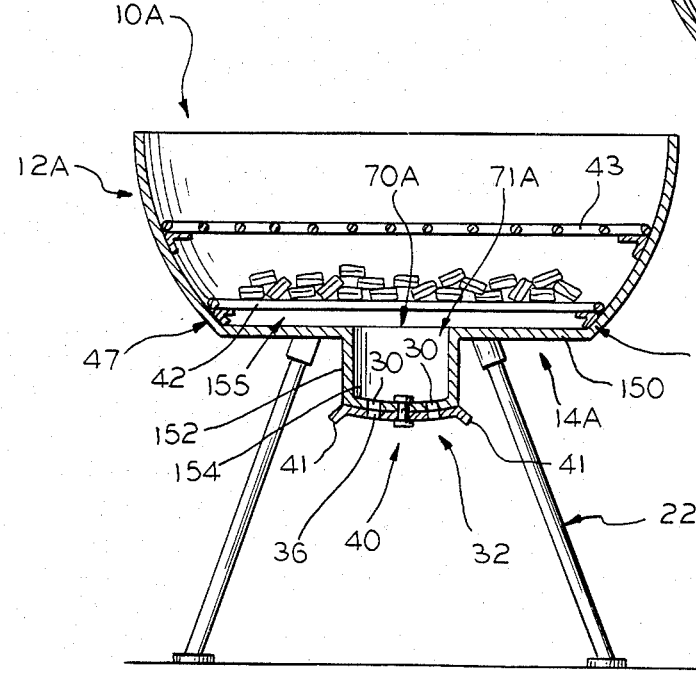
FIG. 10
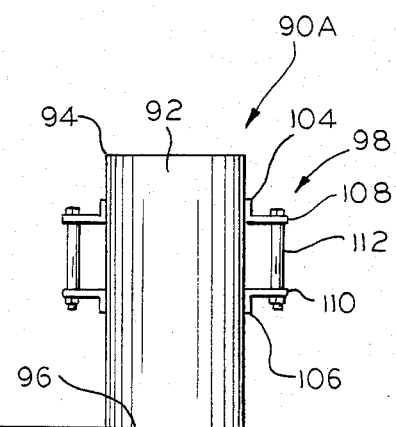

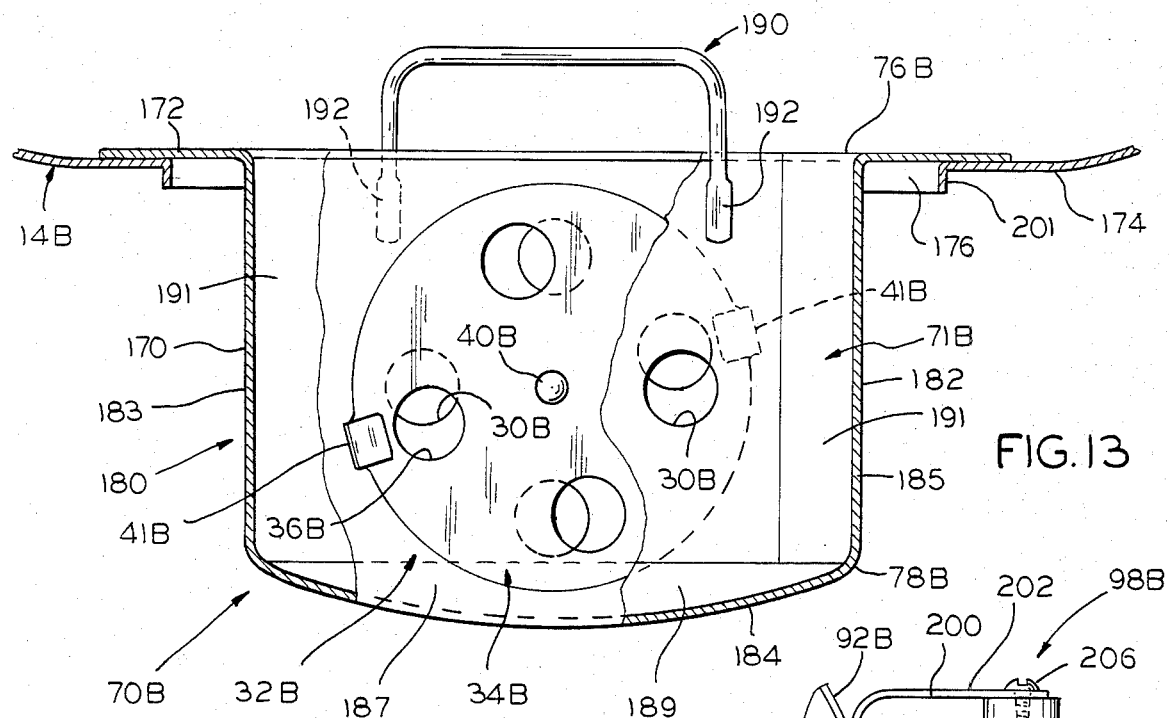
FIG. 13
FIG. 14
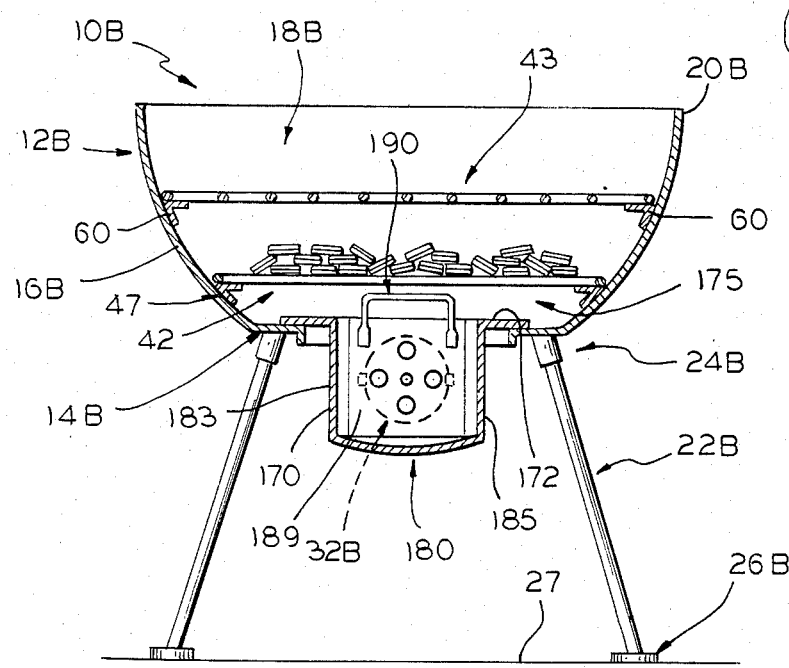
FIG. 15

BARBEQUE GRILL WITH PAPER START FACILITY

This application is a continuation-in-part of my application Ser. No. 502,705, filed June 9, 1983, abandoned.

This invention relates to barbeque grills, and more particularly to charcoal fired grills of the barbeque type that are widely used for home outdoor cooking.

Barbeque grills of the type indicated are available in a wide variety of models and shapes for both closed and/or open barbeque cooking using charcoal to provide the source of heat. Typically, the grills of this type comprise a receptacle that defines a floor having one or more draft openings that may or may not be adjustable, a charcoal supporting grid that is removably mounted across the floor of the receptacle, and a cooking grid that is removably mounted in or on the receptacle in spaced relation above the charcoal supporting grid. Both grids are foraminous in nature, they each typically being formed from spaced rods or the like suitably bonded together in criss cross relation, with the rods of the charcoal grid being spaced to support the charcoal (typically in the common briquet form) that is to cook the food, and the rods of the cooking grid being spaced to support the food to be cooked.

Regardless of the specific nature of any particular grill of this general type, a common characteristic of and problem with these grills is that the charcoal is to be ignited using a liquid petroleum "starter" of one of the many makes and brands available for this purpose. Common practice in this regard is to temporarily remove the food cooking grid from the receptacle, spread the charcoal on the charcoal grid that is placed within the receptacle for this purpose, apply liberal amounts of the liquid starter to the charcoal, and then ignite the starter with a match. The evaporating starter fluid ignites readily without exploding and the liquid phase of the starter ignites as well. If the charcoal is dry and well soaked with the starter, the charcoal starts to burn, and fully or largely ignites in due course, under the draft provided through the grill draft openings. However, when the charcoal is not thoroughly dry, or it has not been thoroughly soaked with the starter, or the ambient conditions are windy or otherwise adverse, it may be necessary to repeat the igniting process, which has its risks because the partially ignited charcoal will be hot and it is likely to cause explosive igniting of the starter, either as it is being applied, or when ignited with a match.

In any event, those who are seriously concerned with the taste of the food they are cooking are usually aware of the fact that a sufficient amount of the starter remains during the cooking process to adversely affect the taste of the food that has been cooked. During the cooking procedure, fumes originating from the starter continue to emerge from the charcoal and from the floor of the grill and are absorbed by food as it is being cooked.

Furthermore, the burning of the starter, while relatively clean in appearance, does involve the passing of obnoxious fumes into the atmosphere, and considering the wide popularity of this form of outdoor cookery, the large amount of the relatively expensive liquid starter products used to start the charcoal of charcoal fired barbeque grills does seem to be a wasteful use of fundamentally scarce petroleum products. The use of electric starting rods to start charcoal is one alternate that is used occasionally, but the large amount of electrical energy, and the wiring therefor, that are needed for this purpose involve factors of expense that necessarily limit the use of electric starters.

A principal object of the present invention is to provide a charcoal barbeque grill in which the charcoal may be conveniently started using readily available tinder, such as paper, light cardboard, wood shavings, or the like, readily combustible or imflamable, non-petroleum product or based, materials.

Another principal object of the invention is to provide a barbeque grill that basically retains the popular outdoor cooking attraction of this type of grill, while permitting the use of waste newspaper or the like to fire the charcoal, so that both the charcoal and grill will be free of the objectionable petroleum based starter fumes during cooking, the expense of the starter may be avoided to start with, and the starting material employed may be in the form of used newspapers or other paper or paper like materials that when used are ordinarily discarded as trash and disposed of through suitable trash collection procedures.

Yet another principal object of the invention is to provide, in a charcoal grill arranged to have the usual charcoal and food supporting grids, a tinder receiver disposed between the charcoal grid and the grill receptacle floor draft openings, and a charcoal receiver that is open ended and formed for substantially congruent alignment positioning of same with respect to the tinder receiver prior to application of the cooking grid to the grill, so that with the tinder receiver charged with newspaper or the like, and the charcoal grid in place within the receptacle, the charcoal receiver may be placed on the charcoal grid above the tinder receiver, and have charcoal applied thereto in a columnar manner, for firing of the charcoal by igniting the paper in the tinder receiver, with the charcoal, after being ignited, being spread as needed on the charcoal grid using the charcoal receiver as the spreading implement, for subsequent cooking using the cooking grid.

Yet other important objects of the invention are to provide a simplified charcoal barbeque grill with paper start facility, to provide a charcoal grill of the type indicated that lends itself to mass production and sales techniques, and to provide a barbeque grill of the type indicated that is economical of manufacture, easy and economic to operate, and long lived in use.

In accordance with the invention, a barbeque grill is provided, and with paper start facility, comprising an open top receptacle that defines a floor which includes one or more draft openings that may be adjustable in size employing a conventional opening or orifice adjusting arrangement. The grill includes a tinder receiver that is centrally received in, or formed in the receptacle, in alignment with the receptacle draft openings. The receptacle includes a charcoal support grid and means for removably mounting same in the receptacle over the receptacle floor and above and adjacent the level of the upper end of the tinder receiver. The equipment associated with grill includes a charcoal receiver in the form of an open ended sleeve of impervious sheet metal material that includes a pair of oppositely located upright manipulating handles adjacent to and spaced laterally of its upper end, with the charcoal receiver being proportioned to be disposed in substantial congruent relation with the tinder receiver, and on the charcoal support grid above the tinder receiver, for charcoal start purposes. The grill also includes the usual food cooking grid and means for removably mounting same in the receptacle above the charcoal grid, after the charcoal is ignited, in accordance with the practice of the invention, and the charcoal receiver is removed from the grill.

The grill may be of any desired shape, and be arranged for either open or closed cooking, as desired.

When the grill is to be used, the grill cover, if any, the food cooking grid, and the charcoal support grid are removed and placed to one side. The tinder receiver is then charged with tinder, such as waste newspaper, wrapping paper, paper bags, or the like, and the charcoal grid is returned to its operative position overlying the grill receptacle floor, and the tinder receiver. The charcoal receiver is then positioned on the charcoal support grid in substantially congruent relation with the tinder receiver, with the charcoal receiver then being charged with charcoal to the extent that charcoal is needed for cooking the particular food project, such as meat or fowl, that is to be involved. The tinder charge is then ignited, and this may be conveniently done through the receptacle draft openings, by using a match or a cigarette lighter or the like, to effect initiation of burning of the tinder. As the tinder burns the resulting flames and hot gases pass upwardly into and through the charcoal receiver and about the charcoal, quickly effecting full ignition of the charcoal charge. When the charcoal charge is substantially or fully ignited, the user of the grill then grasps the handles of the charcoal receiver with either hand to lift the charcoal receiver upwardly as needed to discharge, and guide the discharge of the charcoal fully onto the charcoal support grid, with the lower end of the charcoal receiver being shifted to spread the charcoal over the charcoal grid as needed to appropriately position the charcoal briquets involved as desired or needed for cooking purposes. The charcoal receiver is then put aside, after which the grill cooking grid is disposed in its usual operative relation in the grill receptacle for food cooking purposes. The food cooking can then proceed in the usual manner, with the ignited charcoal providing the cooking heat free of the common petroleum product starter fumes.

Other objects, uses, and advantages will be obvious or become apparent from a consideration of the following detailed description and the application drawings in which like reference numerals indicate like parts throughout the several views.

In the drawings:

FIGS. 8, 9 and 10 are similar to FIGS. 1, 2 and 6, respectively, but illustrate a modified embodiment of the invention;

FIG. 13 is a sectional view of the central portion of the grill receptacle floor and the tinder receiver of the FIGS. 11 and 12 embodiment of the invention, but on a larger scale to better illustrate details of construction;

FIG. 14 is a fragmental plan of the charcoal receiver of the embodiment of FIGS. 11-13, better illustrating the handle arrangement of same; and FIG. 15 is a view similar to those of FIGS. 6 and 10, but showing the embodiment of FIGS. 11-14.

Figure 1:
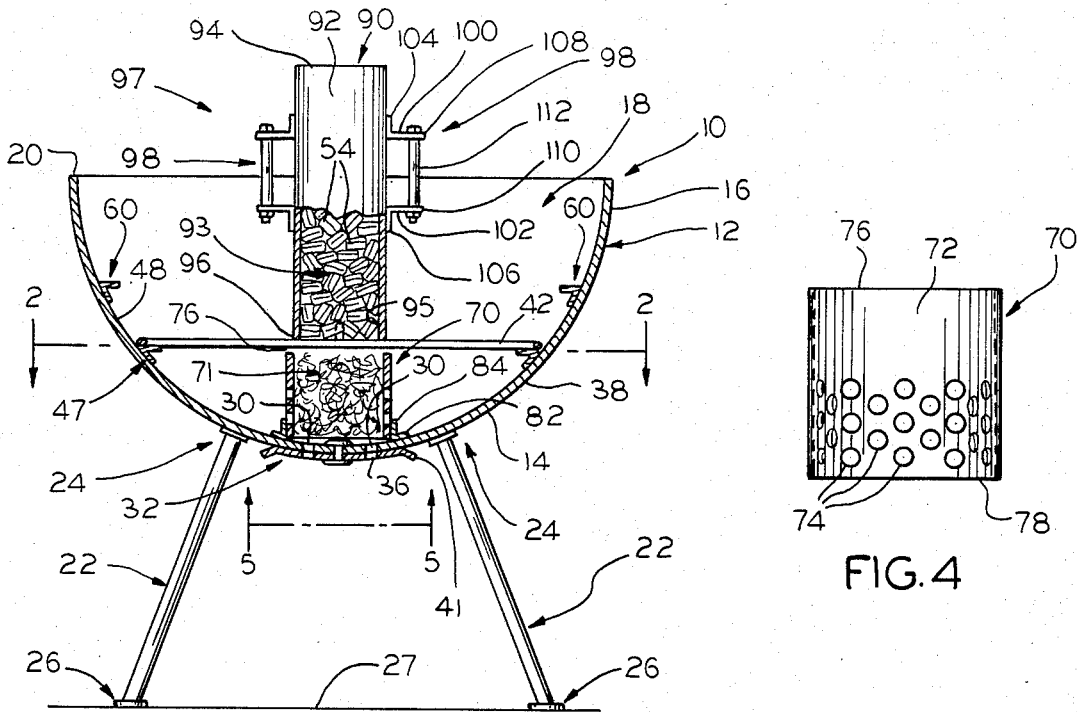
FIG. 1 is a diagrammatic vertical sectional view, partially in elevation, illustrating a first charcoal fired barbeque grill arranged in accordance with the present invention, and in the process of effecting igniting of the charcoal, with FIG. 1 in effect being a view taken substantially along line 1—1 of FIG. 3.

However, it is to be distinctly understood that the specific drawing illustrations provided are supplied parimarily to comply with the requirements of the Patent Laws, and that the invention is susceptible of modifications and variations that will be obvious to those skilled in the art, and that are intended to be covered by the appended claims.

Referring first to FIGS. 1-7, reference numeral 10 generally indicates one embodiment of the barbeque grill arranged in accordance with the present invention, which comprises a receptacle 12 defining a floor 14 and upstanding side wall 16 which define cooking chamber 18. The receptacle 12 that is illustrated is of the common bowl type configuration in which the floor 12 and side wall 16 are of integral one piece construction and have the essentially hemispherical shell configuration that is indicated in the drawings and that is concentric about central axis 21. The receptacle 12 is open at its upper end 20 and may be used for either open or closed cooking purposes, and for closed cooking purposes a suitable cover is usually provided, which is not illustrated as it is not part of the present invention.

Receptacle 12 is suitably supported, as by employing legs 22 that in the form shown are three in number (only two are illustrated), disposed in 120 degree tripod type spacing about the underportion of the receptacle and being suitably connected in any convenient way to the receptacle 14 as at 24, with the legs 22 having suitable feet 26 which may be adjustably mounted. The legs 22 of the receptacle 10 may be of any suitable type and the illustration of same is diagrammatic only because the details of construction of same have no particular concern with the present invention other than the receptacle 12 should be suitably supported above the support surface 27 to space the receptacle therefrom due to the heat that is involved in the cooking procedure, and the need to provide air draft space for cooking.

The receptacle 12 at its floor is provided with one or more air draft openings 30 for providing for air draft action through the cooking charcoal, as is conventional with barbeque grills, with a suitable form of air draft opening adjustment device preferably being provided. In the drawings, air draft control device 32 is diagrammatically illustrated, which comprises disc 34 that is formed to define air draft openings 36 that are the same in number and location with regard to spacing as the receptacle air draft openings 30, with the disc 34 being suitably journalled on the underside surfacing 38 of the receptacle 12, as by employing suitable rivet device 40, so that the user, by grasping one of the handles 41 that are integral with the disc 34, can adjust the effective size of the air draft openings 30, for air control purposes, by appropriately positioning the disc openings 36 with respect thereto, in the usual manner, with full alignment, partial alignment, or full block off positions being commonly provided.

The grill 10 also includes the familiar charcoal support grid 42 and the cooking food support grid 43. Both of these grids may be of any conventional type, those illustrated being generally circular in marginal outline for complementary fit purposes within their receptacle 12. The grid 42 comprises marginal circular rodding 44 of circular arcuate configuration to which are suitably fixed in spaced apart relation appropriate lengths of rectilinear rodding 46. The grid 42 rests, as is conventional, on appropriately spaced angle brackets 47 that are suitably affixed to the inside surfacing 48 of the receptacle 12, in the manner suggested in FIGS. 1 and 3.

The grid 43 is similarly constructed, and for the type of grill 10 illustrated, is of somewhat larger diameter, and also comprising marginal rodding 50 of circular arcuate configuration that forms the margin of the grid 43, to which are suitably fixed in spaced apart parallel relation the rectilinear rods 52. The rectilinear rods 46 of the grid 42 are spaced apart to support standard sized charcoal briquets 54, which are to be ignited in the practice of this invention. The recilinear rods 52 of the grid 43 are spaced apart to adequately support the various types of food that are to be cooked in grill 10, as is conventional, and depending upon the specific type of grill involved. The grid illustrated is of the type typically employed for cooking steaks, chops, hamburgers and the like.

The cooking grid 43 is removably mounted in the receptacle 12 in a manner similar to the charcoal support grid 42, with the inside surfacing 48 of the receptacle being provided with a suitable number of grid support brackets 60 for this purpose that are suitably secured to the receptacle in a usual coplanar relationship indicated in the drawings that is also provided by the corresponding support brackets 46 for the grid 42.

The rods making up grids 42 and 43 may be lengths of chrome coated steel or any other material normally used for these purposes.

In accordance with the present invention, the grill includes a tinder receiver that is applied about the receptacle draft openings 30 under the grid 42. The tinder receiver 70 of grill 10 comprises open ended sleeve 72 that is formed by a length of suitable metallic material, such as ordinary steel, arched to have its ends suitably fixed together, as by employing welding or the like, to define the cylindrical configuration illustrated. The sleeve 72 preferably is apertured to define a multitude of draft openings or ports 74 that are in spaced relation about the lower margin of the sleeve 72, 360 degrees thereabout to provide for air draft flow into the sleeve 72 from within chamber 18, as will be described hereinafter. The tinder receiver 70 defines open upper end 76 and open lower end 78, with the tinder receiver 70 being put in its operating position within the receptacle 12 by resting the end 78 on the inside surfacing 48 by the receptacle 12, with the sleeve 72 disposed in centered relation about the receptacle draft openings 30. Preferably, the receptacle 12 is provided with a plurality of angle type mounting brackets 80 suitably anchored to the receptacle about the location of its air draft openings 30 so that the tinder receiver 70 can readily be placed in its centered operating position indicated in FIGS. 1 and 2. The brackets comprise in the form illustrated a length of a suitable metallic material having one arm 82 suitably anchored to the receptacle 12, as by employing rivets or the like, and an upstanding arm 84 that serves as the mounting guide for the tinder receiver. In the embodiment illustrated, four such brackets 80 are illustrated and are disposed about the air draft area of the receptacle to position the upstanding bracket arms 84 so that the sleeve 72 may be readily slipped in between same to properly center the tinder receiver with respect to the grill air draft openings, which for the grill 10 illustrated, is at the axial center of the grill.

As indicated in FIG. 1, the sleeve 72 is proportioned so that the charcoal support grid 42 overlies same when the grid 42 is resting on its brackets 46.

Further in accordance with the invention, the grill includes charcoal receiver 90 that comprises for grill 10 elongate sleeve 92 that also may be formed from a length of metallic material, such as ordinary steel, which preferably is imperforate and is arched to have its ends fixed together, as by employing welding, to define the cylindrical configuration indicated for sleeve 92. The sleeve 92 is preferably proportioned to have a diameter approximating that of the tinder receiver 70, with the charcoal receiver 90 in the specific embodiment illustrated being of somewhat smaller diameter than the tinder receiver 70. The charcoal receiver 90 defines open upper end 94 and open lower end 96 and has suitably affixed to same a pair 97 of oppositely located handle structures 98 that in the form illustrated each comprises metallic angle members 100 and 102 that respectively define the respective mounting arms 104 and 106 that are suitably affixed to the sleeve 92, as by employing rivets or the like, and handle mounting arms 108 and 110 between which is secured an upright grasping handle grip member in the form of bar 112 that is preferably formed from a suitable heat insulating material such as wood or a suitable heat resistant plastic. The handle bar 112 of each handle structure 98 is suitably anchored to the respective mounting arms 108 and 110, as by employing a suitable screw and nut mounting device 114, the shank of which extends through the bar 112 and mounting arms 108 and 110. The handle structure 98 may take various forms of specific construction arrangement, but preferably the handle structure employed defines a hand grip member comparable to the upright hand grip member 112 which is spaced from sleeve 92 a suitable amount so that the user can grasp the hand grip member 112 without incurring injury due to burning when the sleeve is hot as will be clear from the description of use that follows hereinafter. While the handle bar is preferably formed from a suitable heat insulating or resistant material, it may be formed also from metal if it is disposed sufficiently remote from sleeve 92 to remain cool enough to be grasped, as indicated, for releasing and spreading the charcoal.

Also, the hand grip member 112 of each handle structure 98 preferably is disposed in parallel relation to the longitudinal central axis of the sleeve 92, and the handle structures 98 themselves are mounted adjacent the upper end of the sleeve 92, with the result that the user of the grill equipment involved can readily grip receiver 90 for easy manipulation in the manner to be described.

The charcoal receiver may alternately be shaped to be somewhat frusto-conical so as to gradually converge from its lower end 96 to its upper end 94; however, the illustrated cylindrical configuration is preferred.

It will be noted that the tinder receiver 70 defines tinder receiving chamber 71, and the charcoal receiver 90 defines charcoal receiving chamber 93. In the case of the tinder receiver 70, the chamber 71 is defined by the inside surfacing 73 of the sleeve 72, while in the case of the charcoal receiver 90 the chamber 93 is defined by the inside surfacing 95 of the sleeve 92.

Figures 2, 3:
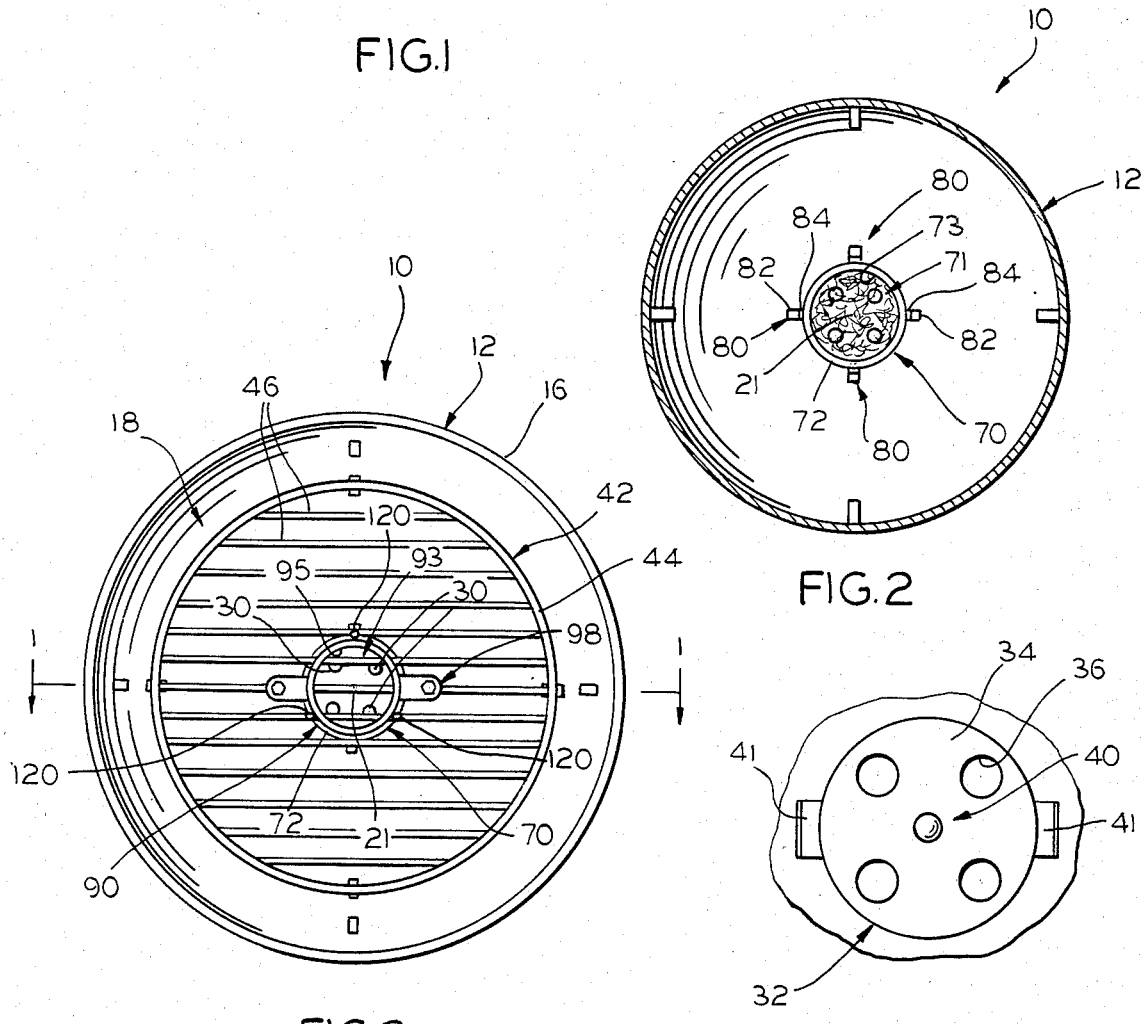
FIG. 2 is a diagrammatic horizontal sectional view taken substantially along line 2—2 of FIG. 1.
FIG. 3 is a plan view of the barbeque grill conditioned as indicated in FIG. 1, but with the charcoal briquets and tinder omitted.
Figures 4, 5:
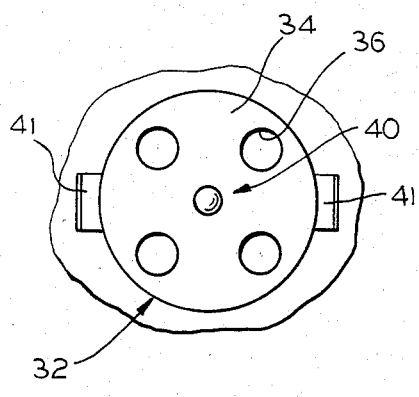
FIG. 4 is a side elevational view of the tinder receiver itself, of the embodiment of FIGS. 1—3.
FIG. 5 is a fragmental plan view taken substantially along line 5—5 of FIG. 1, illustrating an adjustable draft control arrangement of a commonly available type that may be employed to adjust the size of the draft openings of the grill receptacle.
Figure 7:
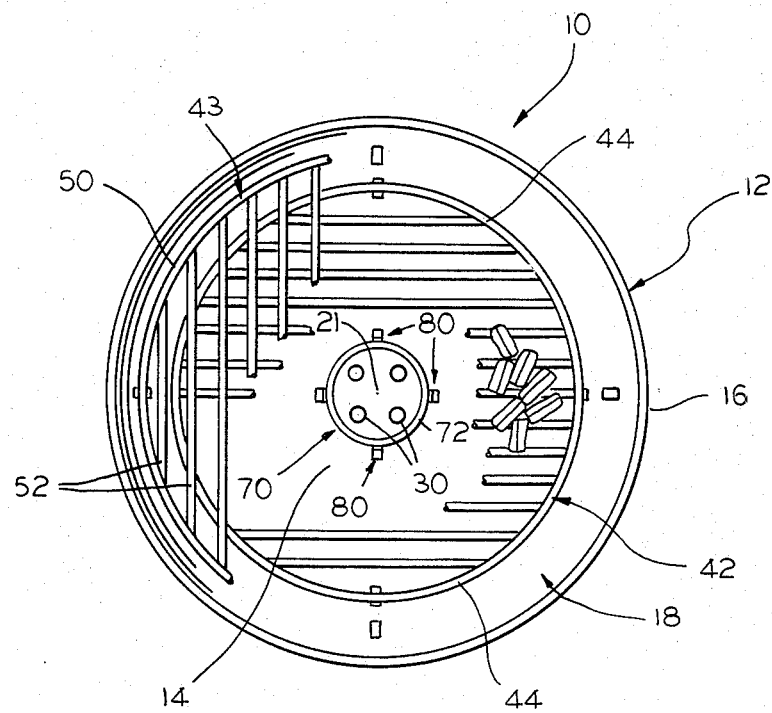
FIG. 7 is a top plan view of the grill as shown in FIG. 6, with parts broken away to facilitate illustration and tth spread charcoal only partially illustrated to avoid obscuring component parts of the grill underlying same.

In using the grill 10, the grids 42 and 43 are removed from the receptacle 12 and put to one side; assuming that the tinder receiver 70 is in its operative position within the receptacle that is indicated in FIGS. 1 and 2, the air draft control valve 32 is positioned in its wide open position, and the tinder receiver chamber is charged with newspaper or the like, which can be waste paper crumpled up for this purpose. It is preferable to not fill the chamber 71 too tightly so that the tinder charge will readily burn when ignited, and crumpled paper placed loosely in the chamber 71 is preferred for this purpose. Other charging materials can be employed, however, that are of the tinder type, such as wood shavings, dry bark and twigs, or the like, or any combination of same including paper.

Thereafter, the grid 42 is put in place in its operative position indicated in the drawings, and the charcoal receiver 90 is disposed on top of same, with its lower end 96 resting on the grid 42, and the charcoal receiver aligned in substantially centered, congruent relation, with the tinder receiver 70. The grid 42 may have fixed thereto a plurality of short rods 120 or the like, suitably affixed to conveniently located rectilinear rods 46, as as to be disposed to serve as centering abutments for positioning the lower end 96 of the charcoal receiver in its indicated centered relation with respect to the tinder receiver 70. However, these may be omitted as receiver 90 may be centered by sight above receiver 77 with relative ease.

The chamber 93 of the charcoal receiver 90 is then appropriately charged with the charcoal, which is usually supplied in the familiar briquet form indicated by reference numeral 54. The amount of charcoal to be employed usually depends on the type of cooking to be done, and for this purpose the charcoal receiver 90 is of elongated configuration in sufficient length dimension to provide the charcoal capacity that might be needed for any cooking purpose that may be encountered.

In any event, when the charcoal receiver 90 is appropriately charged with the charcoal briquets, the tinder in the tender chamber 91 is ignited by employing a match or the like, or a cigarette lighter or the like, to ignite same through the air draft openings 30 and 36 which have been aligned for this purpose. The tinder in tinder chamber 71 being of highly inflammable material such as paper, burns with the flames and heated gases that pass directly against and about and through the charcoal in the charcoal chamber 90, the shaping of which provides a chimney effect that establishes a strong air draw through the air draft openings 30 and 36 and the perforations 74 of the tinder receiver 70 to ignite the charcoal progressively from the lower end of the charcoal receiver 90 up to the top of the level of the charcoal in the chamber 93.

The user of the grill 10 will be able to observe when all of the charcoal is ignited by observing the charcoal through the open end 94 of the receiver 90; when the charcoal has been fully ignited, the user, facing the receiver 90, grasps the respective handle structure 98, by using one hand to grasp the handle member 112 of one handle structure 98, and his other hand to grasp the handle member 112 of the other handle structure 98. He then lifts the charcoal receiver 90 sufficiently upwardly and rather slowly, so as to gradually discharge the charcoal fully onto the grid 42. As this is being done, the user maneuvers the charcoal receiver around over the grid 42 so as to guide the discharge of the charcoal about the upper side of the grid 42, and uses the lower end 96 of the receiver 90 to spread the charcoal as may be further needed, before and after the charcoal has gravitated from the receiver 90. After all charcoal has gravitated from the receiver 90, the user may further shift the charcoal as needed on the grid 42, using the lower end 96 of the sleeve 92 as a pushing and pulling implement. Thus, the lower end 96 of sleeve 92 may be used to push the individual ignited briquets as needed, or the open end 96 may be placed about a number of same to draw them about the grid 42 as needed to properly position the briquets according to the user's desires.

Figure 6:
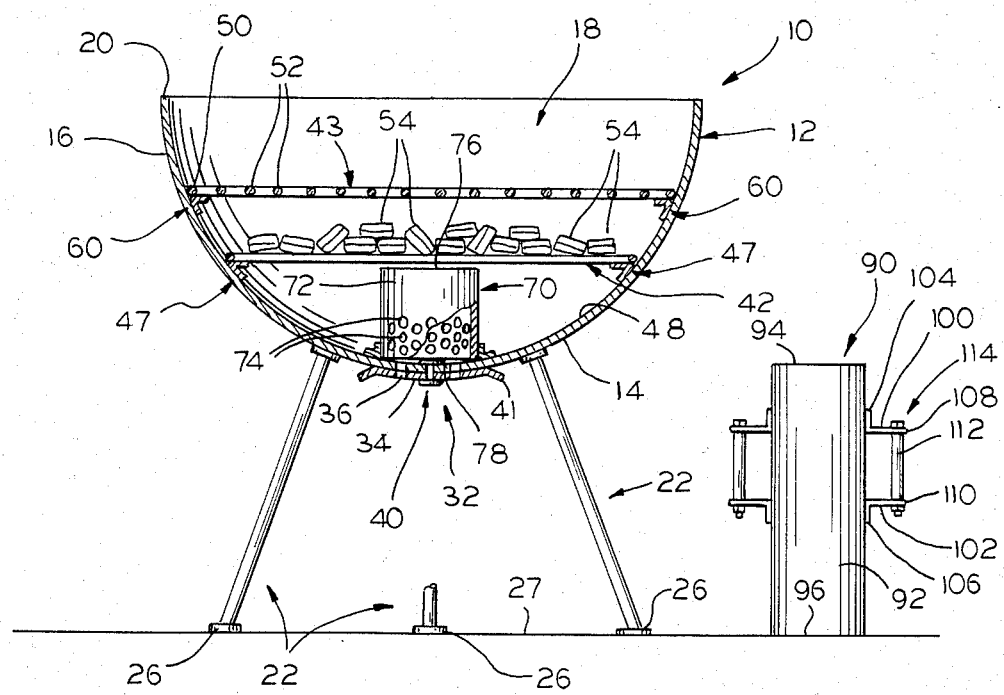
FIG. 6 is a view similar to that of FIG. 1, but illustrating the grill of FIGS. 1-5 after the charcoal has been ignited and spread on the charcoal support grid, and the cooking grid put in place within the grill receptacle for cooking purposes.

With the ignited charcoal briquets placed as desired on the grid 42, the charcoal receiver 90 is put to one side, such as indicated in FIG. 6, and the cooking grid 43 disposed in its operating position to receive the food that is to be cooked, and cooking proceeds in the usual manner. As indicated, for open cooking no cover is employed, and for closed cooking, the receptacle 12 is equipped with a suitable cover.

In any event, the cooking of the food proceeds without the presence of the conventional petroleum product started in the grill that so often adversely affects the taste of the barbequed food where such starter is employed. Once the tinder charge has been burned, it completely dissipates and is usually reduced to an ash by the time cooking is started, leaving no undesirable gases or fumes to rise through the charcoal and adversely affect the taste of the barbequed food. Thereafter, the perforations 74 provide for air flow from within tinder receiver 70, from the appropriately set air control valve 32, radially outwardly of same, for substantially uniform air draft distribution of air from valve 32 to grid 42 both internally and externally of receiver 70. Air control valve 32 may be set in the usual manner for providing user control of the air draft supply to grid 42.

While the arrangement of the grill illustrated is of the rounded hemispherical type, it will be apparent that the shape of the grill receptacle and its grids may also take one of the familiar quadrilateral forms that are commonly encountered in various types and makes and models of barbeque grills.

In the modified grill 10A of FIGS. 8-10, the tinder receiver 70A and the chamber 71A defined by same are formed by shaping receptacle 12A so that its floor 14A defines horizontal base portion 150 that is concentric about central axis 21A, and that is integral with depending cylindrical wall 152 having integral floor portion 154 that may have the same spherically contoured arching as the lower portion of floor 14 of receptacle 12 (as shown), or it may be planar or flat, as desired. Floor portion 154 is formed to define air draft openings 30, and control device 32 is employed in connection therewith in the same manner as grill 10. Where floor portion 154 is planar, device 32 will be similarly contoured for close fitting relation to floor portion 154.

The horizontal base portion 150 is in a plane that parallels that of receptacle upper end 20, but is at a level relative to brackets 46 such that an air gap or space is present between grid 42 and receptacle base portion 150, where indicated at 155. The wall 152 and its floor portion 154 form tinder receiver 70A and its chamber 71A, which are thus integral with receptacle 12A. In this embodiment the charcoal receiver 90A has a diameter that somewhat exceeds that of chamber 71A, as indicated in FIG. 8. The grill 10A is otherwise the same as grill 10.

The grill 10A is used in a manner similar to grill 10, with the tinder being applied to the tinder chamber 71A to approximately the top of same. When the tinder of chamber 71A is ignited, the resulting flames, the air from the aligned air draft openings 30 and 36, and ambient air from about the charcoal receiver lower end 96, between it and the floor portion 150, and thus through gap 155, pass, under the chimney effect involved, into and through the charcoal chamber 93 of receiver 90A, to progressively ignite the charcoal as afore-described.

It will be apparent that the tinder receiver 70A and its chamber 71A may be formed by walls 152 and 154 being integral in a separate bowl configuration that may be suitably affixed to floor portion in centered relation to receptacle 12A. After the charcoal is ignited and spread, the gap 155 provides for adequate air draft supply from valve device 32 radially outwardly of tinder chamber 71A.

Turning now to the modified grill 10B of FIGS. 11–15, it will be seen that this embodiment of the invention, which is believed to be the best mode of practicing the invention, comprises receptacle 12B having a floor 14B and a side wall 16B that define cooking chamber 18B. Receptacle 12B is open at its upper end 20B in the form illustrated and supported by suitable legs 22B suitably connected to receptacle at 24B and having the usual feet 26B that gauge support surface 27.

The receptacle 12B is also shown to be equipped with the previously described charcoal grid 42 that is to rest on the brackets 47 therefor, and the food support or cooking grid 43 that is to rest on the brackets 60 therefor. However, where the grid 42 is arranged to provide for height adjustment, the brackets 47 as such will not be needed.

In the modified grill 10B, the tinder receiver 70B and the chamber 71B defined by same are formed by a separate dished wall structure 170 having support flange 172 in circumambient relation thereabout; further, the receptacle 12B is shaped so that floor 14B forms planar base portion 174 that is to be substantially centered with respect to the central axis 21B of the receptacle 12B and be substantially horizontally disposed when the receptacle 12B is mounted on its legs 22B for the usual support above supporting surface 27. The floor horizontal base portion 174 is formed to define circular opening 176 that is in coaxial relation with the central axis 21B of the receptacle 12B, with the opening 176 being proportioned to receive the dished wall structure 170 therein, and with the circumambient flange 172 thereof resting on the floor base portion 174, in normal use of the grill 10B (see FIGS. 11 and 15).

As in the grill 10A of FIGS. 8–10, the floor base portion 174 is in a plane that parallels that of the receptacle upper end 20B, but is at a level relative to the level of the operating positions of grid 42 such that an air gap or space is present between the grid 42 when in use and the receptacle base portion 174, where indicated at 175.

The dished wall structure 170 and its circumambient flange 172 define a separate and removable bowl or compartment 180, including circumambient side wall 182 that is integral thereabout, and spherically contoured and imperforate bottom wall 184 that define the tinder receiver 70B and its tinder receiving chamber 71B. The tinder receiver 70B is open at its top or upper end 76B to receive the tinder, and closed at its lower end 78B by bottom wall 184.

In the form shown, the bowl 180 forming the tinder receiver 70B has its side wall 182 of generally four sided configuration defining a first set of opposed planar walls 183 and 185, and a second set of opposed planar walls 187 and 189 separated from the respective walls of the first set by corner walls 191, whereby the tinder receiving chamber 71B is basically of four sided configuration, although the actual shaping of chamber 71B as such as not critical. Bowl 180 is equipped with a pair of oppositely positioned air draft control devices 32B applied to the opposed walls 187 and 189 that include the openings 30B formed in the side wall 182 in opposed relation on either side of the bowl 180, the respective discs 34B that are pivotally mounted in place by the rivets 40B, the openings 36B of the respective discs 34B that are oriented to be aligned with the tinder receiver wall openings 30B, respectively, for each device 32B, and the aforementioned handles 41B for appropriately positioning the devices 32B (which are the same as devices 32 of FIGS. 1–9 except that they are flat since they are applied to flat walls). The number of the air draft control devices 32B employed is optional although at least one of such devices mounted on the bowl side wall 182 at one of the 183, 185, 187, or 189 is desired.

In accordance with this embodiment of the invention, the tinder receiver 70B is made removable, and the floor 184 of same is made impervious or closed so that the ashes left by burning the tinder to start the charcoal, in operating the grill, may be periodically emptied by removing the tinder receiver 70B. For this purpose, the tinder receiver 70B is equipped with a pair of oppositely located handles 190 of simple U shaped configuration, each being equipped with a pair of ends 192 for suitably anchoring the respective handles 190 in place on the bowl side wall 182 in the indicated opposite relation. The handle ends 192 are shown flattened to facilitate rivet type mounting, but this may be omitted where resistance welded connections are employed. Handles 190 may be secured to the walls 187 and 189, as shown, or to the other two walls 183 and 185, as desired.

Figure 11:
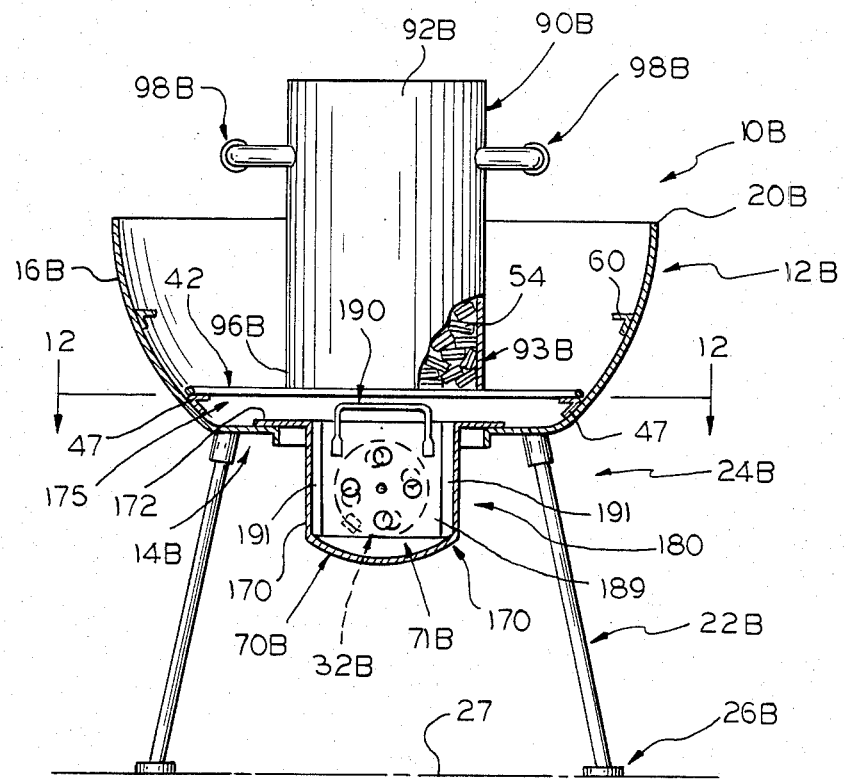
FIGS. 11 and 12 are similar to FIGS. 1 and 2, respectively, but illustrate a further modified embodiment of the invention.
Figure 12:
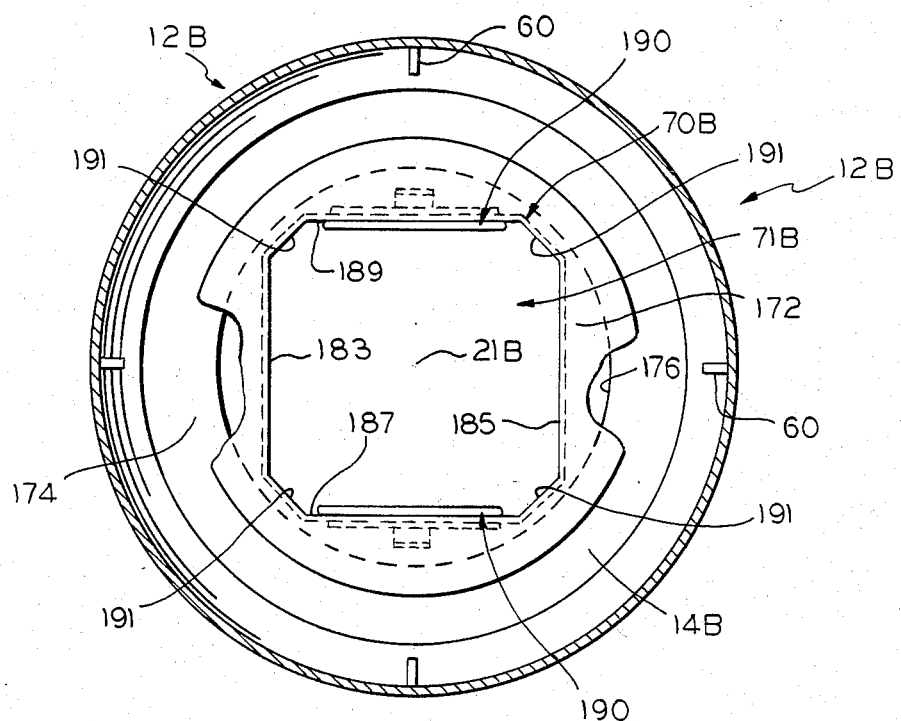

Thus, when the grill 10B has been used to the extent that the ashes left over from the tinder employed to start the charcoal have reached a level in the tinder chamber 71B, where they tend to block the air draft control device or devices 32B, on removal of the two grids, the grill operator may grasp one or both the handles 190, and lift the bowl 180 upwardly to remove it from the receptacle opening 176, and appropriately dump the tinder ashes in a trash can or the like, after which the bowl 180 is replaced to the position indicated in FIGS. 11 and 15 of the drawings. It is recommended that the ash be so removed from the bowl 180 each time the grill 10B is used.

The bowl 180 may be formed from any suitable material, such as metal or the like, that is appropriate for forming the receptacles of conventional barbeque grills. In the form of FIGS. 11–15, the receptacle is downwardly flanged, as at 201, about the circumference of floor opening 176, with the corner walls 191 of bowl 180 having a centering action on bowl 180 when it is returned to its operating position of FIGS. 11 and 12, for ready reapplication of the tinder receiver 70B to receptacle 12B.

The charcoal receiver 90B of the grill 10B is similar to charcoal receiver 90A and thus is formed from a suitable sleeve 92B or the like. In the form shown, the charcoal receiver 90B is provided with handle structures 98B of the simplified form more specifically shown in FIG. 14, wherein each handle structure 98B comprises a U shaped mounting member 200 formed from strip metal or the like and that is suitably riveted or otherwise affixed to sleeve 92B and defines a pair of outwardly projecting end portions 202 and 204 that receive a handle 204 that is in the form of a cylinder formed from a heat nonconductive material such as wood or a suitable plastic, proportioned to closely fit within the respective mounting bracket end portions 202 and 204 and be secured in place by suitable screws 206. As indicated in FIG. 11, the handle structures 98B are disposed oppositely of each other or 180 degrees apart with regard to the circumference of the sleeve 92B and with their handles 204 disposed in substantially coplanar spaced apart relation equidistant from the central axis 21B of the grill, with the handles 204 thus being horizontally disposed when the charcoal receiver 90B is in use. Receiver 90B, like receivers 90 and 90A, is in practice a combination charcoal receiving and distributing device that is discrete with respect to the grill 10B, and all these receivers may be formed with one or more vent openings adjacent their lower ends to improve draft, if desired.

The grill 10B is used in a manner similar to the way grills 10 and 10A are used, with the tinder being applied to the tinder chamber 71B to approximately the top of same, and with the air draft control device or devices 32B with which the bowl 180 is equipped being opened for igniting of the tinder of the chamber 71B therethrough. Where more than one device 32B is provided on the bowl 180, only one such device need be open to ignite the tinder. In any event, when the tinder of the chamber 71B is ignited, the resulting flames, the air from the draft openings 30B and 36B that are aligned, and ambient air from the charcoal receiver lower end 96B (between it and the floor portion 174), and thus through gap 175, pass, under the chimney effect involved, into and through the charcoal chamber 93B, to progressively ignite the charcoal as aforedescribed.

After the charcoal is ignited and spread by employing the charcoal receiver 90B as aforedescribed, the gap 175 provides for adequate air draft supply about the lower end of the charcoal receiver circumferentially thereabout.

As indicated, when the grill 10B has been used often enough to have an undue accumulation of ash in the bowl 180, the bowl 180 may be removed and the ash dumped or otherwise disposed of. It is preferable that the venting provided by the devices 32B provided not be blocked by accumulated ash. It will be apparent that in the embodiment 10B the tinder receiver 70B rests under gravity on the receptacle floor base portion 174 and within the opening 176 defined by same, and that tinder receiver 70B is operative as such in any random positioning of same within receptacle opening 176, three hundred sixty degrees thereabout and about the grill central axis 21B.

It will therefore be seen that the invention provides a simplified barbeque grill that has paper start capability and completely avoids the need for the problem petroleum starter as conventionally employed to start the ignition of charcoal in the widely popular barbeque grill facilities that are so commonly employed in homes and other domestic situations around the country. The tinder receiver in one embodiment is of simple sleeve like open ended construction but may be defined by the grill receptacle, or be a separate movable bowl, as in the other embodiments. In all forms the tinder receiver accommodates not only waste paper, but other highly combustible materials that are safe to use as tinder, such as wood shavings, dry bark (as, for instance, birch bark), dry sticks and twigs, excelsior, or any combination of same, which tinder burns with sufficient heat and flaming to ignite the charcoal of the charcoal receiver that is applied over the tinder chamber.

The charcoal receiver is of simple open ended sleeve construction that defines a removable charcoal ignition chamber which, when in its operative position, provides a strong chimney effect whereby the burning gases and flames are subject to a strong drawing action through and about the charcoal to quickly ignite same. The charcoal receiver thereafter is hand manipulated by the user to expeditiously place and locate the ignited charcoal briquets as desired on or about the upper surface of the charcoal support grid for cooking purposes, after which it is put aside until again needed for charcoal starting purposes. The food support grid is put in place in the usual manner to receive the food that is to be cooked barbeque style.

After the charcoal is started, and put in its cooking position, the air draft control device or devices 32 may be positioned as desired to control the flow of air to and through the burning charcoal, in the usual manner.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a barbeque grill that includes a receptacle of open top bowl configuration having a central portion centered on same, at a central axis that extends normally of the plane of the receptacle top, with the receptacle defining a floor that is centered on the axis, and including a charcoal support grid and means for removably mounting same in the receptacle above and in operative overlying relation to the receptacle floor, and a food cooking grid and means for removably mounting same above and in operative overlying relation to the charcoal support grid, with the grids being respectively proportioned to be substantially centered on the central axis when mounted in the receptacle in their respective operative relations, and with the grids being disposed normally of the central axis when mounted in the receptacle in their respective operative relations, and means for mounting the receptacle for cooking purposes with the central axis of the receptacle substantially vertically disposed, the improvement wherein said grill includes:

a tinder receiver located below the level of the charcoal support grid, when the latter is in its said operative relation, and defining a tinder receiving chamber that is substantially centered on the central axis and that is proportioned transversely of said central axis to receive a tinder charge of predetermined size, said tinder receiver defining an open upper end through which the tinder charge may be inserted into said tinder receiving chamber when the grids are removed from the receptacle for charging said tinder receiver with tinder, said tinder receiver underlying the charcoal support grid across said tinder receiving upper end thereof when said charcoal support grid is in its operative relation, a combination charcoal receiver and distributing device that is discrete with respect to said grill and comprises an elongate annular sleeve having an open center extending therethrough and open upper and lower end portions defining a charcoal receiving chamber that is open at the upper and lower ends of same and has a central axis extending longitudinally of said sleeve, said charcoal receiver device lower end being formed to rest on the charcoal support grid, when the charcoal support grid is mounted in the receptacle in its said operative relation, said charcoal receiver device being proportioned transversely of its central axis to receive in said chamber thereof a charcoal charge that transversely of said charcoal receiver central axis approximates the corresponding dimensioning of said tinder receiver chamber, and means for venting ambient air exterior of said receptacle into said tinder chamber for providing for igniting and supporting combustion of a tinder charge received therein, said charcoal receiver device having a pair of oppositely disposed handles fixed to said sleeve adjacent said upper end thereof and each comprising a hand grip portion disposed externally of said sleeve for gripping by the grill user's right and left hands respectively, for shifting said receiver device lower end relative to and over the charcoal support grid, whereby, when the grill is to be used for charcoal food cooking, and on removal of both the grids from the receptacle to expose said tinder receiving chamber upper end, the tinder charge may be applied to said tinder chamber and the charcoal grid returned to its operative relation, whereupon said charcoal receiver device may be rested on the charcoal grid in substantial vertical alignment with said tinder receiver and with said lower end portion of said charcoal receiver device engaging the charcoal grid, a charcoal charge may be applied to said charcoal receiver device chamber through said charcoal receiving chamber upper end, and the tinder charge may be ignited through said venting means to effect ignition and burning of the charcoal charge by chimney effect through said charcoal receiver device chamber, and after the charcoal charge is ignited, the user, facing the grill, may grasp said charcoal receiver device handles with his right and left hands, respectively, to sufficiently lift same upwardly of the charcoal support grid and shift the lower end of the charcoal receiver device over the charcoal grid, for controlled discharge of the ignited charcoal from said device, and spreading of the charcoal, onto the charcoal grid, after which said charcoal receiver device is moved out of the grill and set to one side, and said cooking grid may be disposed in said operative relation thereof for food cooking purposes over the ignited charcoal.

2. The improvement set forth in claim 1 wherein:
said tinder receiver comprises a sleeve that is removably mounted in said receptacle,
said tinder receiver sleeve having a foraminous side wall that is in circumambient relation thereabout.

3. The improvement set forth in claim 1 wherein:
said tinder receiver is defined by said receptacle floor.

4. The barbeque grill set forth in claim 1 wherein:
said charcoal receiver device sleeve comprises an imperforate side wall that is in circumambient relation thereabout,
and said proportioning of said charcoal receiver device transversely of its said central axis exceeds the corresponding dimensioning of said tinder receiver chamber.

5. The improvement set forth in claim 1 wherein:
the charcoal grid includes means for indexing said charcoal receiver device lower end portion into said alignment with said tinder receiver when said charcoal receiver device is rested on the charcoal grid for firing a charcoal charge to be received in said charcoal receiver device.

6. The improvement set forth in claim 1 wherein:
said tinder receiver is separably supported on the receptacle and comprises a bowl for containing the ash formed from igniting tinder charge placed therein,
and including means for removing said tinder receiver for dumping the said ash therefrom.

7. The improvement set forth in claim 6 wherein:
said means for venting comprises an air draft control device mounted on said bowl.

8. The improvement set forth in claim 6 wherein:
the receptacle floor is apertured to receive said bowl,
said bowl including a circumambient flange thereabout for resting of said bowl on the receptacle floor under gravity.

9. The improvement set forth in claim 9 wherein:
said bowl has an imperforate floor for holding the tinder ash therein on igniting of the tinder.

10. The improvement set forth in claim 8 wherein:
said bowl is formed for random positioning in said receptacle floor aperture 360 degrees thereabout.

11. In a barbeque grill that includes a receptacle of open top bowl configuration having a central portion centered on same, at a central axis that extends normally of the plane of the receptacle top, with the receptacle defining a floor that is centered on the axis, and including a charcoal support grid and means for removably mounting same in the receptacle above and in operative overlying relation to the receptacle floor, and a food cooking grid and means for removably mounting same above and in operative overlying relation to the charcoal support grid, with the grids being respectively proportioned to be substantially centered on the central axis when mounted in the receptacle in their respective operative relations, and with the grids being disposed normally of the central axis when mounted in the receptacle in their respective operative relations, and means for mounting the receptacle for cooking purposes with the central axis of the receptacle substantially vertically disposed, the improvement wherein said grill includes:
a tinder receiver located below the level of the charcoal support grid, when the latter is in its said operative relation, and defining a tinder receiving chamber that is substantially centered on the central axis and that is proportioned transversely of said central axis to receive a tinder charge of predetermined size, said tinder receiver defining an open upper end through which the tinder charge may be inserted into said tinder receiving chamber when the grids are removed from the receptacle for charging said tinder receiver with tinder, said tinder receiver underlying the charcoal support grid across said tinder receiving upper end thereof when said charcoal support grid is in its operative relation, a combination charcoal receiver and distributing device that is discrete with respect to said grill and comprises an elongate annular sleeve having an open center extending therethrough and open upper and lower end portions defining a charcoal receiving chamber that is open at the upper and lower ends of same and has a central axis extending longitudinally of said sleeve, said charcoal receiver device lower end being formed to rest on the charcoal support grid, when the charcoal support grid is mounted in the receptacle in its said operative relation, said charcoal receiver device being proportioned transversely of its central axis to receive in said chamber thereof a charcoal charge that transversely of said charcoal receiver central axis approximates the corresponding dimensioning of said tinder receiver chamber, and means for venting ambient air exterior of said receptacle into said tinder chamber for providing for igniting and supporting combustion of a tinder charge received therein, said charcoal receiver device having handle means fixed to said sleeve adjacent said upper end thereof for shifting said receiver device lower end relative to and over the charcoal support grid, whereby, when the grill is to be used for charcoal food cooking, and on removal of both the grids from the receptacle to expose said tinder receiving chamber upper end, the tinder charge may be applied to said tinder chamber and the charcoal grid returned to its operative relation, whereupon said charcoal receiver device may be rested on the charcoal grid in substantial vertical alignment with said tinder receiver and with said lower end portion of said charcoal receiver device engaging the charcoal grid, a charcoal charge may be applied to said charcoal receiver device chamber through said charcoal receiving chamber upper end, and the tinder charge may be ignited through said venting means to effect ignition and burning of the charcoal charge by chimney effect through said charcoal receiver device chamber, and after the charcoal charge is ignited, the user, facing the grill, may grasp said charcoal receiver device handle means to sufficiently lift same upwardly of the charcoal support grid and shift the lower end of the charcoal receiver device over the charcoal grid, for controlled discharge of the ignited charcoal from said device, and spreading of the charcoal, onto the charcoal grid, after which said charcoal receiver device is moved out of the grill and set to one side, and said cooking grid may be disposed in said operative relation thereof for food cooking purposes over the ignited charcoal, said tinder receiver being separably supported on the receptacle and comprising a bowl for containing the ash formed from igniting tinder charge placed therein, and including means for removing said tinder receiver for dumping the said ash therefrom, with the receptacle floor being apertured to receive said bowl, said bowl including a circumambient flange thereabout for resting of said bowl on the receptacle floor under gravity.

12. The improvement set forth in claim 11 wherein: said bowl being formed for random positioning in said receptacle floor aperture 360 degrees thereabout.

* * * * *